US012260687B2

(12) United States Patent
Mikkelsen et al.

(10) Patent No.: US 12,260,687 B2
(45) Date of Patent: Mar. 25, 2025

(54) SENSORY INDUCEMENT STRATEGIES FOR VEHICLE SYSTEMS

(71) Applicant: GM Global Technology Operations LLC, Detroit, MI (US)

(72) Inventors: Karl Bo Albert Mikkelsen, Peachland (CA); Lynn Varghese, Novi, MI (US); Thomas M. Sherman, Pinckney, MI (US); Justin Bunnell, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 141 days.

(21) Appl. No.: 18/318,224

(22) Filed: May 16, 2023

(65) Prior Publication Data
US 2024/0386761 A1    Nov. 21, 2024

(51) Int. Cl.
| | |
|---|---|
| G07C 5/08 | (2006.01) |
| B60W 50/00 | (2006.01) |
| B60W 50/038 | (2012.01) |
| B60W 50/16 | (2020.01) |
| B60W 50/14 | (2020.01) |

(52) U.S. Cl.
CPC ....... *G07C 5/0833* (2013.01); *B60W 50/0097* (2013.01); *B60W 50/038* (2013.01); *B60W 50/16* (2013.01); *B60W 2050/143* (2013.01); *B60W 2720/10* (2013.01)

(58) Field of Classification Search
CPC .......... B60W 2050/143; B60W 50/16; B60W 50/038; G07C 5/0833
See application file for complete search history.

(56) References Cited

U.S. PATENT DOCUMENTS

| | | | |
|---|---|---|---|
| 12,151,665 B2 * | 11/2024 | Ullrich .................. | B60T 13/665 |
| 2021/0335064 A1 * | 10/2021 | Kim ....................... | G07C 5/0833 |
| 2022/0410865 A1 * | 12/2022 | Fagergren ............... | B60T 17/22 |
| 2023/0177891 A1 * | 6/2023 | Mizrachi .................. | G07C 5/04 |
| | | | 701/32.1 |
| 2024/0062310 A1 * | 2/2024 | Rosenbaum .......... | G06F 21/552 |
| 2024/0198995 A1 * | 6/2024 | Marx .................... | B60T 17/225 |
| 2024/0203168 A1 * | 6/2024 | Starkey ............ | G08G 1/096725 |

\* cited by examiner

*Primary Examiner* — Jaime Figueroa
*Assistant Examiner* — Zachary Joseph Wallace
(74) *Attorney, Agent, or Firm* — Vivacqua Crane, PLLC

(57) ABSTRACT

A method for inducing a vehicle occupant to bring a vehicle to a stop includes receiving malfunction data. The malfunction data is indicative of an impending vehicular malfunction will occur in a vehicle; determining that the impending vehicular malfunction will occur using the malfunction data. The method also includes determining that the vehicle is capable of operating without hazards for a predetermined amount of time in response to determining that the impending vehicular malfunction will occur. Further, the method includes commanding an actuator of the vehicle to provide a sensory feedback to the vehicle occupant to induce the vehicle occupant to stop the vehicle in response to determining that the impending vehicular malfunction will occur and determining that the vehicle is capable of operating without hazards for a predetermined amount of time.

13 Claims, 2 Drawing Sheets

SENSORY INDUCEMENT STRATEGIES FOR VEHICLE SYSTEMS

INTRODUCTION

The present disclosure relates to a sensory inducement strategies for vehicle systems.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Some vehicles have failure modes that may not be apparent to the vehicle occupant until these failures become a hazard. It is therefore useful to induce the vehicle occupant to stop the vehicle 10 before the vehicular failures become a hazard.

SUMMARY

The present disclosure relates to sensory inducement strategies for vehicle systems. In an aspect of the present disclosure, a method for inducing a vehicle occupant to bring a vehicle to a stop includes receiving malfunction data. The malfunction data is indicative of an impending vehicular malfunction will occur in a vehicle; determining that the impending vehicular malfunction will occur using the malfunction data. The method also includes determining that the vehicle is capable of operating without hazards for a predetermined amount of time in response to determining that the impending vehicular malfunction will occur. Further, the method includes commanding an actuator of the vehicle to provide a sensory feedback to the vehicle occupant to induce the vehicle occupant to stop the vehicle in response to: (a) determining that the impending vehicular malfunction will occur; and (b) determining that the vehicle is capable of operating without hazards for a predetermined amount of time.

Implementations may include one or more of the following features. The method where the impending vehicular malfunction is at least one of a steering malfunction, a braking malfunction, or an immobilizer malfunction, the predetermined amount of time is zero, and the method may include commanding the vehicle to stop. The method may include limiting the speed of the vehicle to a maximum speed value in response to determining that the impending vehicular malfunction will occur with the predetermined amount of time. The maximum speed value decreases over time. The method may include commanding the vehicle to stop before the predetermined amount of time has lapsed. The method may include actuating a park pawl of the vehicle to immobilize the vehicle once the vehicle has stopped. Commanding the actuator of the vehicle to provide the sensory feedback to the vehicle occupant includes generating an audible sound that simulates the impending vehicular malfunction. The method may include commanding a user interface of the vehicle to provide a message indicative of the impending vehicular malfunction in response to determining that the impending vehicular malfunction will occur. The sensory feedback includes a tactile feedback to the vehicle occupant.

The present disclosure also describes a tangible, non-transitory, machine-readable medium, comprising machine-readable instructions, that when executed by a processor, causes the processor to execute the method described above.

The present disclosure also describes a vehicle including a controller programmed to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
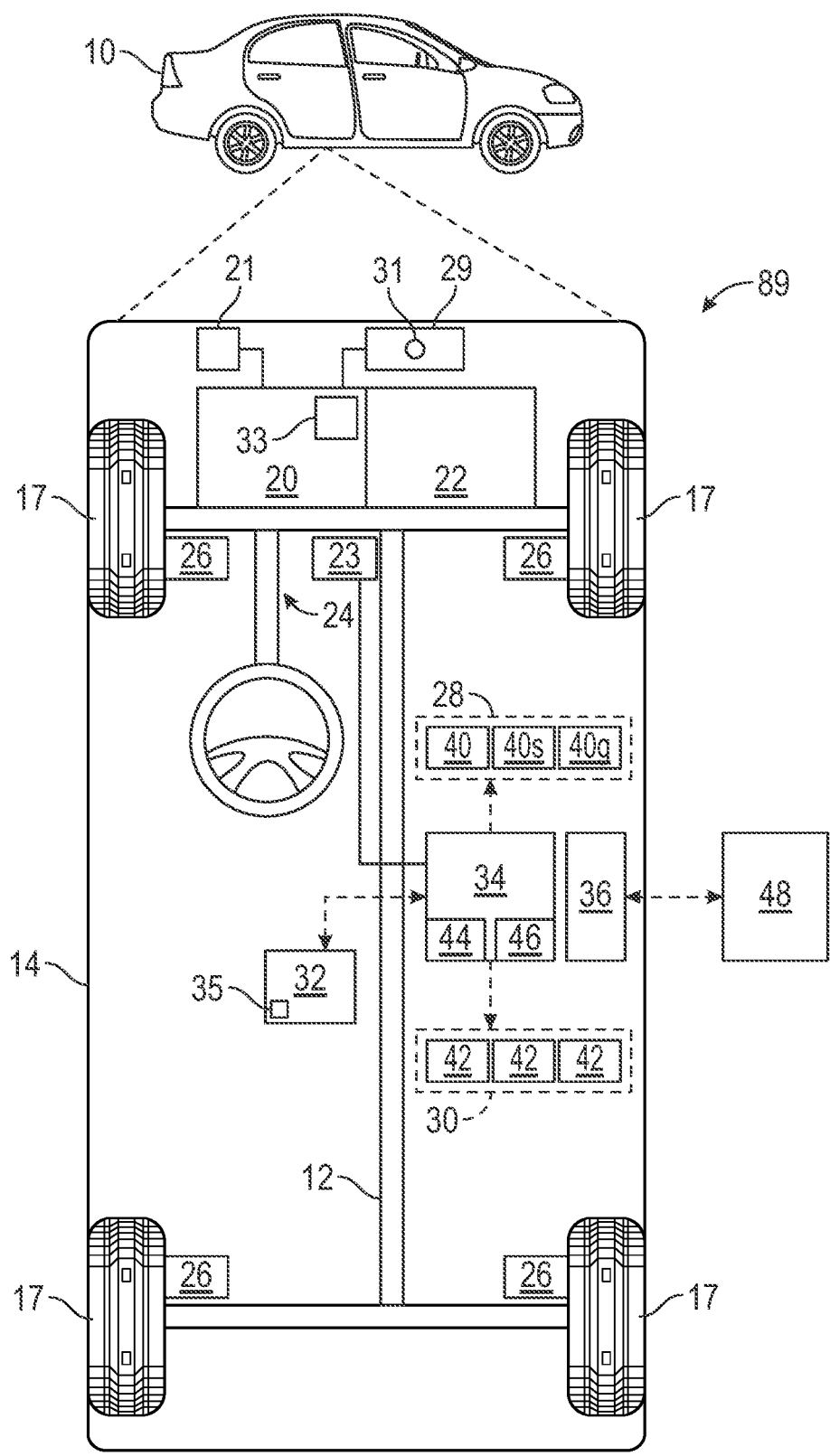
FIG. 1 is a schematic diagram depicting an embodiment of a vehicle including a system providing sensory inducements for vehicle systems.

Reference will now be made in detail to several examples of the disclosure that are illustrated in accompanying drawings. Whenever possible, the same or similar reference numerals are used in the drawings and the descriptions to refer to the same or like parts or steps.

As depicted in FIG. 1, a vehicle 10 generally includes a chassis 12, a body 14, front and rear wheels 17 and may be referred to as the host vehicle. The vehicle 10 may be referred to as a motor vehicle. The body 14 is arranged on the chassis 12 and substantially encloses components of the vehicle 10. The body 14 and the chassis 12 may jointly form a frame. The wheels 17 are each rotationally coupled to the chassis 12 near a respective corner of the body 14. The vehicle 10 may be an autonomous vehicle, and a control system 89 is incorporated into the vehicle 10. The control system 89 may alternatively be referred to as a vehicle system. The vehicle 10 is, for example, a vehicle that is automatically controlled to carry passengers from one location to another. The vehicle 10 is depicted in the illustrated embodiment as a passenger car, but it should be appreciated that another vehicle including motorcycles, trucks, sport utility vehicles (SUVs), recreational vehicles (RVs), marine vessels, aircraft, etc., can also be used.

The vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may include an electric machine such as a traction motor and/or a fuel cell propulsion system. The vehicle 10 further includes a battery (or battery pack) 21 electrically connected to the propulsion system 20. Accordingly, the battery 21 is configured to store electrical energy and to provide electrical energy to the propulsion system 20. Additionally, the propulsion system 20 may include an internal combustion engine 33 having a plurality of cylinders. When the propulsion system 20 engages active fuel management (AFM), not all of the cylinders of the internal combustion engine 33 are active. Conversely, when the propulsion system disengages AFM, all of the cylinders of the internal combustion engine 33 are active. The transmission system 22 is configured to transmit power from the propulsion system 20 to the vehicle wheels 17 according to selectable speed ratios. The transmission system 22 may include a step-ratio automatic transmission, a continuously-variable transmission, or other appropriate transmission. The brake system 26 is configured to provide braking torque to the vehicle wheels 17. The brake system 26 may include friction brakes, brake by wire, a regenerative braking system such as an electric machine, and/or other appropriate braking systems. The steering system 24 influences the position of the vehicle wheels 17. While depicted as including a steering wheel for illustrative purposes, the steering system 24 may not include a steering wheel. The vehicle 10 may include an air-conditioning system 29 with a compressor 31 coupled to the internal combustion engine 33 of the propulsion system 20. The compressor 31 may be driven by the internal combustion engine 33.

The sensor system 28 includes one or more sensors 40 that sense observable conditions of the exterior environment and/or the interior environment of the vehicle 10. The sensors 40 may include, but are not limited to, radars, lidars, global positioning systems, optical cameras, thermal cameras, ultrasonic sensors, clocks for measuring time, and/or other sensors. The actuator system 30 includes one or more actuators 42 that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered). The sensor system 28 includes one or more Global Positioning System (GPS) transceiver 40g configured to detect and monitor the route data (i.e., route information). The GPS transceiver 40g is configured to communicate with a GPS to locate the position of the vehicle 10 in the globe. The GPS transceiver 40g is in electronic communication with the controller 34.

The data storage device 32 stores data for use in automatically controlling the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer non-transitory readable storage device or media 46. The processor 44 can be a custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10. The data storage device 32 and/or the computer readable storage device or media 46 may include a map database 35. In the present disclosure, the term 'map database" means a database that stores geographical and topographical data, such as roads, streets, cities, parks, traffic signs, elevation information, two-dimensional or three-dimensional arrangement of objections with attributes to location and category.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although a single controller 34 is shown in FIG. 1, embodiments of the vehicle 10 may include a number of controllers 34 that communicate over a suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the control system 89. The vehicle 10 includes a user interface 23, which may be a touchscreen in the dashboard. The user interface 23 is in electronic communication with the controller 34 and is configured to receive inputs from a user (e.g., vehicle operator). Accordingly, the controller 34 is configured to receive inputs from the user via the user interface 23. The user interface 23 includes a display configured to display information to the user (e.g., vehicle operator or passenger).

The communication system 36 is configured to wirelessly communicate information to and from other entities 48, such as but not limited to, other vehicles ("V2V" communication), infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication system 36 may include one or more antennas and/or transceivers for receiving and/or transmitting signals, such as cooperative sensing messages (CSMs).

FIG. 1 is a schematic block diagram of the control system 89, which is configured to control the vehicle 10. The controller 34 of the control system 89 is in electronic communication with the brake system 26, the propulsion system 20, and the sensor system 28. The brake system 26 includes one or more brake actuators (e.g., brake calipers) coupled to one or more wheels 17. Upon actuation, the brake actuators apply braking pressure on one or more wheels 17 to decelerate the vehicle 10. The propulsion system 20 includes one or more propulsion actuators for controlling the propulsion of the vehicle 10. For example, as discussed above, the propulsion system 20 may include internal combustion engine 33 and, in that case, the propulsion actuator may be a throttle specially configured to control the airflow in the internal combustion engine. The sensor system 28 may include one or more accelerometers (or one or more gyroscopes) coupled to one or more wheels 17. The accelerometer is in electronic communication with the controller 34 and is configured to measure and monitor the longitudinal and lateral accelerations of the vehicle 10. The sensor system 28 may include one or more malfunction sensors 40s configured to sense an impending vehicle malfunction. The malfunction sensor 40s is coupled to the controller 34 and is configured to generate malfunction data, which is indicative that an impending vehicle malfunction will occur. Accordingly, the controller 34 is programmed to monitor impending vehicle malfunctions of the vehicle 10 based on the input from the malfunction sensors 40s. As non-limiting examples, malfunction sensors 40s may include a knock sensor and an oxygen sensor. The controller 34 is programmed to determine that an impending vehicular malfunction will occur using the malfunction data. Aside from the malfunction sensors 40s, the malfunction data may originate from other components of the vehicle 10, such as internal combustion engine 33, the brake system 26, and/or the battery 21.

Modern vehicles have failure modes that may not be apparent to the vehicle occupant until these failures become a hazard. It has been determined that the vehicle occupants are more likely to promptly pull over to the side of the road if they are concerned that continued driving may cause expensive damage to their vehicle 10. To induce the vehicle occupant to stop the vehicle 10, the control system 89 generates a sensory feedback in response to detecting a current or impending vehicular malfunction. For example, the sensory feedback may simulate driveline malfunction by creating artificial torque harshness and unexpected sounds with the throttle applied. In another example, the sensory feedback may simulate vehicle damage using sounds, such as knocking, chattering, clunking, with interior and exterior speakers.

Figure 2:
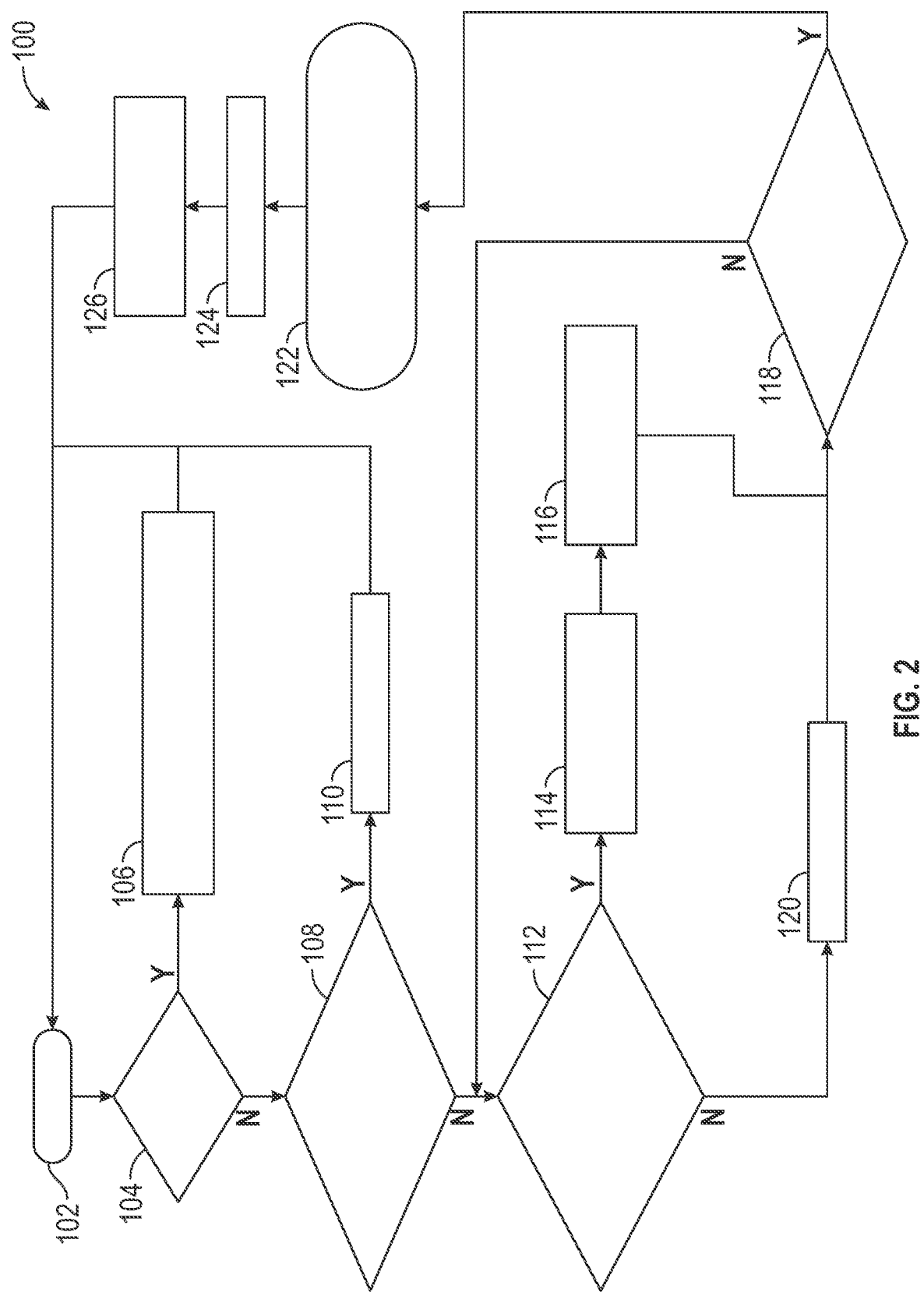
FIG. 2 is a flowchart of a method for sensory inducement strategies for vehicle systems.

FIG. 2 is a flowchart of a method 100 for sensory inducement for vehicle systems. The method 100 may be applied to some of the vehicle systems, such as the propulsion system 20, the transmission system 22, the steering system 24, and/or brake system 26. It is envisioned, however, that the method 100 may be applied to more or fewer vehicle systems. The method 100 begins at block 102. Then, the method 100 proceeds to block 104. At block 104, the controller 34 determines whether the vehicle system (e.g., the propulsion system 20) is fault free. To do so, the controller 34 receives malfunction data from the malfunction sensors 40s or other vehicle components, such as the propulsion system 20. The malfunction data indicates whether an impending vehicular malfunction will occur in the vehicle system of the vehicle 10. Using the malfunction data, the controller 34 then determines whether an impending vehicular malfunction will occur in the vehicle system (e.g., propulsion system 20). As non-limiting examples, the vehicular malfunction may be a current or impending loss of brake-by-wire functionality, a current or impending loss of steer-by-wire functionality, a current or impending loss of computing capability, a current or impending loss of thermal conditioning to a module controlling the brake-by-wire function, a steer-by-wire function, assisted driving function, and/or autonomous driving function, a current or impending loss of sensor functionality, in which the sensor 40 is used for a brake-by-wire function, a steer-by-wire function, assisted driving function, and/or autonomous driving function and/or a current or impending loss of electrical power to a model used for brake-by-wire function, a steer-by-wire function, assisted driving function, and/or autonomous driving function. At block 104, the controller 34 determines whether the vehicle system (e.g., brake system 26) is fault free. If the vehicle system is fault free (i.e., no impending vehicular malfunction will occur), then the method 100 proceeds to block 106. At block 106, the controller 34 sets the degraded state to normal. This setting (i.e., Normal Degraded State) is indicative that the vehicle system is operating normally without fault. After block 106, the method 100 returns to block 102.

If, at block 104, the controller 34 determines that the vehicle system is not fault free, then the method 100 continues to block 108. In this case, the controller 34 determines that an impending vehicular malfunction will occur in the vehicle system. At block 108, the controller 34 determines whether the vehicle system can operate continuously without hazards, such as motion hazards, for a first predetermined amount of time. This first predetermined amount of time should be large enough to allow the vehicle occupant to react before the impending vehicular malfunction occurs. As a non-limiting example, this first predetermined amount of time may be between five minutes and fifteen minutes to allow the vehicle operator to find an appropriate place to stop before the vehicle system malfunctions. At block 108, if the vehicle system (e.g., brake system 26) can operate continuously without hazards for the first predetermined amount of time, then the method 100 proceeds to block 110. At block 110, the controller 34 sets the degraded state to a warning stage. In response, the controller 34 commands the user interface 23 to display a message indicative of the impending vehicular malfunction in response to determining that the impending vehicular malfunction will occur. The message may include the name of the vehicle system that will malfunction and the type of malfunction. In addition, the message may notify the vehicle occupant that the vehicle 10 should be stopped within the first predetermined amount of time. After block 110, the method 100 returns to block 102.

At block 108, if the vehicle system (e.g., brake system 26) cannot operate continuously without hazards for the first predetermined amount of time, then the method 100 proceeds to block 112. At block 112, the controller 34 determines whether the vehicle system (e.g., brake system 26) can operate continuously without hazards for a second predetermined amount of time. The second predetermined amount of time is less than the first predetermined amount of time. Specifically, the second predetermined amount of time may be between one minute and three minutes and may be just enough time for the vehicle occupant to react to the impending vehicular malfunction.

At block 112, if the controller 34 determines that the vehicle system can operate continuously without hazards for the second predetermined amount of time, then the method 100 proceeds to block 114. At block 114, the controller 34 allows the vehicle to operate for a limited operation time. During this limited time, the controller 34 may limit the speed of the vehicle 10 to a maximum speed value. For instance, the controller 34 may limit the speed of the vehicle 10 at different maximum speed values over time. In other words, the maximum speed values may decrease over time.

The limited operation time may be five minutes. Also, during this limited operation time, for the first minute, the controller 34 allows the vehicle 10 to travel at the first maximum speed value (e.g., seventy-five miles per hour). During this first minute, the controller 34 commands the user interface 23 to display a massage indicative of the impending vehicular malfunction and suggesting the vehicle occupant to find a place to stop the vehicle 10. During this first minute, the user interface 23 may also show a countdown for the time left before the controller 34 shuts down the vehicle 10. For the next three minutes, the controller 34 allows the vehicle 10 to travel at a second maximum speed value (e.g., sixty miles per hour). The second maximum speed value is less than the first maximum speed value. During these three minutes, the controller 34 commands the user interface 23 to display a massage indicative of the impending vehicular malfunction and suggesting the vehicle occupant to find a place to stop the vehicle 10. During these three minutes, the user interface 23 may also show a countdown for the time left before the controller 34 shuts down the vehicle 10. For the last minute of operation, the controller 34 allows the vehicle 10 to travel at a third maximum speed value (e.g., 10 miles per hour). The third maximum speed value is less than the second maximum speed value. During this last minute of operation, the controller 34 commands the user interface 23 to display a massage indicative of the impending vehicular malfunction and suggesting the vehicle occupant to find a place to stop the vehicle 10. During this last minute of operation, the user interface 23 may also show a countdown for the time left before the controller 34 shuts down the vehicle 10. After this last minutes lapsed, the controller 34 commands the vehicle to automatically stop and roadside assistance is automatically contacted. Then, the method 100 proceeds to block 116.

At block 116, the controller 34 commands one or more actuators 42 to provide a sensory feedback to the vehicle occupant to induce the vehicle occupant to stop the vehicle 10. The sensory feedback or inducement may be a tactile feedback (e.g., a vibration simulating a malfunctioning engine such as unsmooth torque), an audible sound that simulates the impending vehicular malfunction (e.g., an engine knocking sound), and/or olfactory feedback that simulates a vehicular malfunction, such as the smell of burning oil. The sensory feedback to the vehicle occupant may be one or more of the following: exaggerating or amplifying an existing failure mode to make it more apparent to the vehicle occupant; creating discomfort for the vehicle occupant to encourage the vehicle occupant to bring the vehicle 10 to a stop and/or exit the vehicle 10; simulating a novel failure mode unrelated to the impending failure mode or impending loss of functionality to a vehicle system; changing the cabin temperature or humidity to create discomfort for the vehicle occupant; changing the cabin fan speed to create discomfort to the vehicle occupant; using heated seats and/or heated steering wheel to create discomfort to the vehicle occupant; using an audible actuator 42 to simulate or exaggerate a failure mode or create discomfort for the vehicle occupant; using the vehicle horn to create discomfort for the vehicle occupant; using an electric motor or inverter induced noise to simulate or exaggerate a failure mode or create discomfort for the vehicle occupant; using a fan under the hood of the vehicle 10 to simulate or exaggerate a failure mode or create discomfort for the vehicle occupant; using cabin speakers and/or the electric vehicle warning sound system to simulate or exaggerate a failure mode or create discomfort for the vehicle occupant; applying unsmooth or choppy torque delivery from the motor system to simulate or exaggerate a failure mode or create discomfort for the vehicle occupant; pulsing the brakes using an anti-lock brakes (ABS) system to simulate or exaggerate a failure mode or create discomfort for the vehicle occupant; pulsing the brakes without using an anti-lock brakes (ABS) system to simulate or exaggerate a failure mode or create discomfort for the vehicle occupant; activating the vehicle hazard lights; displaying text messages in the user interface 23 (e.g., instrument panel cluster or center stack/ratio); and playing a pre-recorded audio file describing the urgency of the impending failure to the vehicle occupant. The frequency, amplitude, and/or intensity of the sensory feedback may be modified as a function of the estimated time until the impending failure, the accelerator pedal position, the vehicle speed, and/or the axle torque requested or delivered. The vehicle speed may be modified by using motors and/or brakes. The axle torque may be modified by using motors and/or brakes. The sensory feedback may entail activating a control surface of the vehicle 10 to create additional aerodynamic drag on the vehicle 10. Also, the vehicle 10 may be more restrictive as a function of the estimated time until the impending failure, the accelerator pedal position, the vehicle speed, and/or the axle torque requested or delivered. After block 116, the method 100 proceeds to block 118.

At block 118, the controller 34 determines whether a minimum risk condition for the vehicle 10 has been achieved. As a non-limiting example, the minimum risk condition may be that the vehicle 10 is stationary. Thus, at block 118, the controller 34 may determine whether the vehicle 10 has stopped.

Returning to block 112, if the vehicle system (e.g., brake system 26) cannot operate continuously without hazards for the second predetermined amount of time, then the method 100 proceeds to block 120. At block 120, the controller 34 sets the degraded state to an emergency state. In the emergency state, the controller 34 commands the vehicle 10 to immediately stop. Then, the method 100 continues to block 118.

As discussed above, at block 118, the controller 34 determines whether the vehicle 10 has achieved its minimum risk condition (e.g., stopped). If the vehicle 10 has not achieved its minimum risk condition (e.g., stopped), then the method 100 returns to block 112. If the vehicle 10 has achieved its minimum risk condition (e.g., stopped), then the method 100 proceeds to block 122.

At block 122, the controller 34 actuates a park pawl of the vehicle 10 to immobilize the vehicle 10 once the vehicle 10 has stopped. Then, the method 100 continues to block 124. At block 124, the vehicle 10 is repaired. Then, the method 100 proceeds to block 126. At block 126, the vehicle 10 is reapproved for operation. Next, the method 100 returns to block 102.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for inducing a vehicle occupant to bring a vehicle to a stop, comprising:
    receiving malfunction data, wherein the malfunction data is indicative of an impending vehicular malfunction will occur in a vehicle;
    determining that the impending vehicular malfunction will occur using the malfunction data;
    in response to determining that the impending vehicular malfunction will occur, determining that the vehicle is capable of operating without hazards for a predetermined amount of time;
    in response to determining that the impending vehicular malfunction will occur, and determining that the vehicle is capable of operating without hazards for a predetermined amount of time, commanding an actuator of the vehicle to provide a sensory feedback to the vehicle occupant to induce the vehicle occupant to stop the vehicle, wherein the sensory feedback includes: generating an audible sound that simulates the impending vehicular malfunction, commanding a user interface of the vehicle to provide a message indicative of the impending vehicular malfunction in response to determining that the impending vehicular malfunction will occur, and an olfactory feedback that simulates impending vehicular malfunction;
    limiting a speed of the vehicle to a maximum speed value in response to determining that the impending vehicular malfunction will occur with the predetermined amount of time, wherein the maximum speed value decreases over time;
    commanding the vehicle to stop before the predetermined amount of time has lapsed; and
    actuating a park pawl of the vehicle to immobilize the vehicle once the vehicle has stopped.

2. The method of claim 1, wherein the impending vehicular malfunction is at least one of a steering malfunction, a braking malfunction, or an immobilizer malfunction, the predetermined amount of time is zero, and the method further comprising commanding the vehicle to stop.

3. The method of claim 1, wherein the sensory feedback includes a tactile feedback to the vehicle occupant that simulates the impending vehicular malfunction.

4. A tangible, non-transitory, machine-readable medium, comprising machine-readable instructions, that when executed by a processor, cause the processor to:
    receive malfunction data, wherein the malfunction data is indicative of an impending vehicular malfunction will occur in a vehicle;
    determine that an impending vehicular malfunction will occur;
    in response to determining that the impending vehicular malfunction will occur, determine that the vehicle is capable of operating without hazards for a predetermined amount of time; and
    in response to determining that the impending vehicular malfunction will occur, and determining that the vehicle is capable of operating without hazards for a predetermined amount of time, command an actuator of the vehicle to provide a sensory feedback to a vehicle occupant to induce the vehicle occupant to stop the vehicle, wherein the sensory feedback includes an olfactory feedback that simulates impending vehicular malfunction.

5. The tangible, non-transitory, machine-readable medium of claim 4, wherein the impending vehicular malfunction is at least one of a steering malfunction, a braking malfunction, or a immobilizer malfunction, the predetermined amount of time is zero, and the tangible, non-transitory, machine-readable medium, further comprising machine-readable instructions, that when executed by the processor, causes the processor to command the vehicle to stop.

6. The tangible, non-transitory, machine-readable medium of claim 4, wherein tangible, non-transitory, machine-readable medium, further comprising machine-readable instructions, that when executed by the processor, causes the processor to:
limit a speed of the vehicle to a maximum speed value in response to determining that the impending vehicular malfunction will occur with the predetermined amount of time.

7. The tangible, non-transitory, machine-readable medium of claim 6, wherein the maximum speed value decreases over time.

8. The tangible, non-transitory, machine-readable medium of claim 7, wherein tangible, non-transitory, machine-readable medium, further comprising machine-readable instructions, that when executed by the processor, causes the processor to command the vehicle to stop before the predetermined amount of time has lapsed.

9. The tangible, non-transitory, machine-readable medium of claim 8, wherein tangible, non-transitory, machine-readable medium, further comprising machine-readable instructions, that when executed by the processor, causes the processor to command a park pawl of the vehicle to actuate to immobilize the vehicle once the vehicle has stopped.

10. The tangible, non-transitory, machine-readable medium of claim 9, wherein tangible, non-transitory, machine-readable medium, further comprising machine-readable instructions, that when executed by the processor, causes the processor to generate an audible sound that simulates the impending vehicular malfunction.

11. The tangible, non-transitory, machine-readable medium of claim 10, wherein tangible, non-transitory, machine-readable medium, further comprising machine-readable instructions, that when executed by the processor, causes the processor to command a user interface of the vehicle to provide a message indicative of the impending vehicular malfunction in response to determining that the impending vehicular malfunction will occur.

12. A vehicle, comprising:
a controller programmed to:
receive malfunction data, wherein the malfunction data is indicative of an impending vehicular malfunction will occur in the vehicle;
determine that the impending vehicular malfunction will occur using the malfunction data;
in response to determining that the impending vehicular malfunction will occur, determine that the vehicle is capable of operating without hazards for a predetermined amount of time; and
in response to determining that the impending vehicular malfunction will occur, and determining that the vehicle is capable of operating without hazards for a predetermined amount of time, command an actuator of the vehicle to provide a sensory feedback to a vehicle occupant to induce the vehicle occupant to stop the vehicle, wherein the sensory feedback includes an olfactory feedback that simulates impending vehicular malfunction.

13. The vehicle of claim 12, wherein the impending vehicular malfunction is at least one of a steering malfunction, a braking malfunction, or an immobilizer malfunction, the predetermined amount of time is zero, and the controller is programmed to command the vehicle to stop.

* * * * *